Jan. 24, 1961 C. J. DE CARO 2,968,984
EXPLOSIVELY ACTUATED STUD WITH A FRONT
GUIDING MEANS WITH A TAPERED FLANGE
Filed March 9, 1955 2 Sheets-Sheet 1
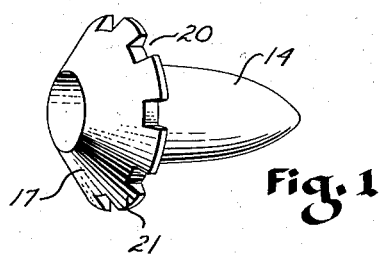
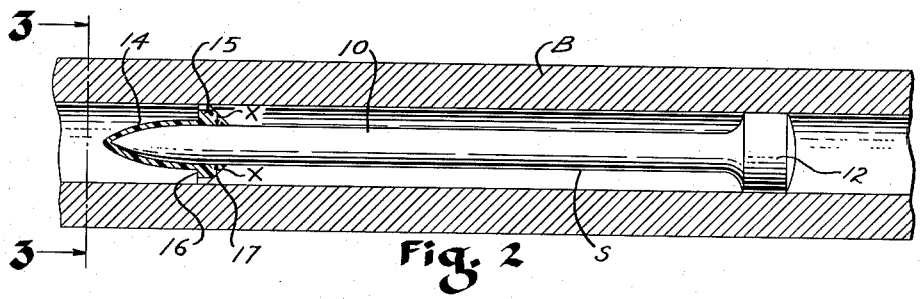
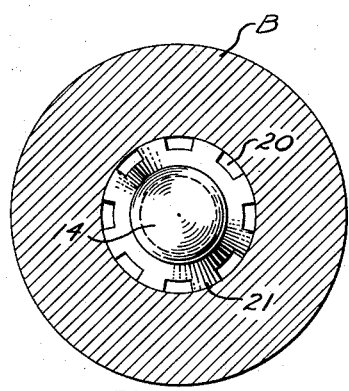
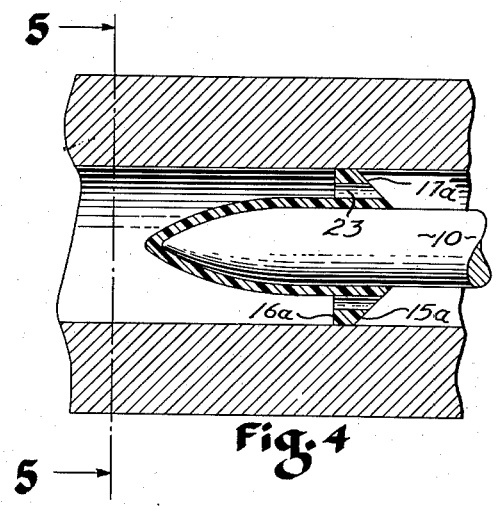
INVENTOR.
Charles J. DeCaro
BY
Hyde, Meyer, Baldwin & Doran
ATTORNEYS INVENTOR.
Charles J. DeCaro
BY
ATTORNEYS United States Patent Office 2,968,984
Patented Jan. 24, 1961

2,968,984

EXPLOSIVELY ACTUATED STUD WITH A FRONT GUIDING MEANS WITH A TAPERED FLANGE

Charles J. De Caro, Cleveland, Ohio, assignor, by mesne assignments, to Olin Mathieson Chemical Corporation, a corporation of Virginia Filed Mar. 9, 1955, Ser. No. 493,254

8 Claims. (Cl. 85—10)

This invention relates to studs and like fastening elements of the type which are fired into steel, concrete, masonry and like relatively hard materials by the use of explosively-actuated hand tools. More particularly, the invention relates to studs and like fastening elements (hereinafter referred to as studs) which are provided with centering and guiding means for the front ends thereof.

The present invention has for one of its objects the provision of a stud of the aforesaid type in which the front centering and guiding means thereof is a one-piece member characterized by its structural simplicity, its economy of manufacture, its inexpensive nature, and its general effectiveness in the performance of its centering and guiding functions.

A further and more specific object of the present invention is the provision of a stud of the aforesaid type in which the front centering and guiding member thereof is so constructed, or is of such shape, that the force of the exploded gases is utilized to help hold the centering and guiding member on the stud during forward travel of the stud through the tool barrel under the influence of such exploded gases.

A further and more specific object of the present invention is the provision of a stud of the aforesaid type in which the front centering and guiding member thereof has a surface preferably one of beveled or tapered form which is so located that the exploded gases, upon striking such surface, develop a component of force tending to press the centering and guiding member against said stud, with consequent assistance in the retention of said centering and guiding member on said stud as it, the stud, travels through the tool barrel under the propelling effect of such gases.

A further more specific object of the present invention is the provision of a stud of the aforesaid type in which the front centering and guiding member thereof is provided with limited gas escape passageways, which may be so constructed and arranged that at least a portion of the exploded gases escaping therethrough may be directed against the centering and guiding member in a manner to assist in the retention of said member on the stud.

A further more specific object of the present invention is the provision of a stud of the aforesaid type in which the gas escape passageways are so formed as to provide circumferentially disposed tool barrel-engaging portions of flexible resilient character, the flexure of such portions enabling the stud with its front centering and guiding member to be readily inserted into the tool barrel without the use of undue force and without the need for any twisting action or the like.

Further objects of the present invention, and certain of its practical advantages, will be referred to in or will be evident from the following description of six embodiments of the invention, as illustrated in the accompanying drawings, in which Fig. 1 is a rear perspective view of a front centering and guiding member for a stud of the aforesaid type, said centering and guiding member being constructed in accordance with one embodiment of the present invention;

Fig. 2 is a view showing in longitudinal section a portion of the barrel of an explosively-actuated tool, with a stud in said barrel having on the front end thereof the centering and guiding member of Fig. 1;

Fig. 3 is a detail cross-sectional view, taken on the line 3—3 of Fig. 2;

Fig. 4 is a view generally corresponding to Fig. 2 but showing a stud having on the front end thereof a modified form of centering and guiding member;

Figure 5:
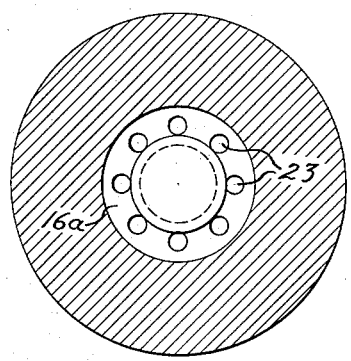
Fig. 5 is a detail cross-sectional view, taken on the line 5—5 of Fig. 4.

Before specifically describing the here illustrated studs, with their various front centering and guiding members, it is to be understood that the present invention may take other forms. It also is to be understood that the terminology or phraseology herein used is for purposes of description and not of limitation, as the scope of the present invention is denoted by the appended claims.

In the accompanying drawings, B designates a portion of the barrel of an explosively-actuated tool, and S designates a stud of the type which is fired into steel, concrete, masonry and like relatively hard materials by the use of such a tool. As shown in Fig. 2, said stud has a shank portion 10, with a pointed or tapered front end to facilitate its penetration of the material into which the stud is to be fired, and a headed rear end portion 12 which is not here threaded but which could be, if desired. Although said headed rear end portion of the stud generally corresponds in diametral size to that of the barrel bore of the tool with which the stud is to be used, such as the tool barrel B, such headed rear end portion is frequently insufficient, due to its relative short length and/or to manufacturing or wear clearance, to accurately center the stud in said tool barrel bore and to guide the stud in its travel through said bore. As a result, it is highly important that the stud be centered and guided at its front end, especially if the elongated shank portion 10 of the stud is relatively short and the headed rear end portion 12 of the stud relatively short. With this invention end 12 may have the shortness or thinness of a nail head and shank 10 can be quite slender.

In the accompanying drawings, studs are shown which have six forms of front centering and guiding means, and as will hereinafter more fully appear, each such centering and guiding means comprises a simple and inexpensive one-piece member, which may be made of any suitable elastically deformable material, with polyethylene plastic material being preferred. The elastic deformability provides the necessary resilience and flexure under the pressure of the exploded gases for obtainment of the advantageous results as set forth herein. The property of the material together with its form give not only initial resilient retention but also radially inward flexure as well as longitudinal or axial flexure.

In the embodiment of the invention illustrated in Figs. 1 to 3 inclusive, the centering and guiding member for the front end of the stud comprises (a) a generally conically-shaped body portion 14 having a correspondingly shaped socket of a size to more or less snugly receive, and be frictionally retained on, the front end part of the stud shank portion (said body portion 14 being of sufficient length, as shown, to embrace and grip the cylindrical part of the stud shank portion rearwardly of its pointed or tapered front end), and (b) a laterally enlarged, generally annular centering and guiding portion 15 for flexible resilient engagement with the tool barrel B.

As shown in Fig. 2, the annular front face 16 of the centering and guiding portion 15 is of radially outwardly extending, generally flat form, but the annular rear face 17 of such centering and guiding portion is of beveled or tapered form. As a result, when the stud and its front centering and guiding member are in their position of use in the tool barrel B, as in Fig. 2, the beveled or tapered rear face 17 of said centering and guiding member is located at a forwardly and outwardly extending angle to the longitudinal axis of said barrel and hence to the exploded gases which escape past the headed relatively short rear end portion 12 of the stud in the use of the tool. Therefore, upon striking the rear face 17 of the centering and guiding member, the exploded gases develop an inwardly directed component of force X, Fig. 2, which tends to press the centering and guiding member inwardly against the stud shank portion, and thus materially aids in the retention of such centering and guiding member on said stud shank portion, as will be readily understood.

This is, of course, of the utmost importance as the stud cannot be properly guided in its travel through the tool barrel B if the front centering and guiding member of the stud is blown off of the stud by the force of the exploded gases. By the present invention, the tendency of the exploded gases to strip the centering and guiding member off of the stud is not only avoided but the force of such gases is actually utilized as a means to assist in the retention of the centering and guiding member on the stud.

To limit the amount of the exploded gases effective thereon, the present stud centering and guiding member is provided with gas by-pass or gas escape passageways. In this particular embodiment of the invention, the tool barrel-engaging portion 15 of the centering and guiding member has its rim or outer edge section of serrated form with the consequent provision of a series of circumferentially disposed gas escape passageways 20. As here shown, the notches which provide such passageways are of straight-sided form and of a width somewhat less than that of the intervening fingers 21, although as will be readily understood, the shape and size of the notches 20 may be varied, as desired.

The serrated form of the rim or outer edge section of the centering and guiding portion 15 of the centering and guiding member not only provides the gas escape notches or passageways 20 but also, provides a series of circumferentially disposed portions 21 of individually flexible resilient form for centering and guiding engagement with the tool barrel B. Because of the flexible resilient nature of these portions or serrations 21, the stud and its centering and guiding member may be readily and conveniently inserted into the tool barrel, without the use of undue force and without the need of any twisting action or the like, a simple straight pushing force being all that is required.

In Figs. 4 and 5, a modified form of stud centering and guiding member is shown, namely, one in which there are gas by-pass apertures, rather than gas by-pass notches. In this second embodiment of the invention, the gas by-pass apertures 23 are arranged in ring or annular form, extending through the centering and guiding portion 15a of the centering and guiding member from its beveled or tapered rear face 17a to its front face 16a.

Figure 6:
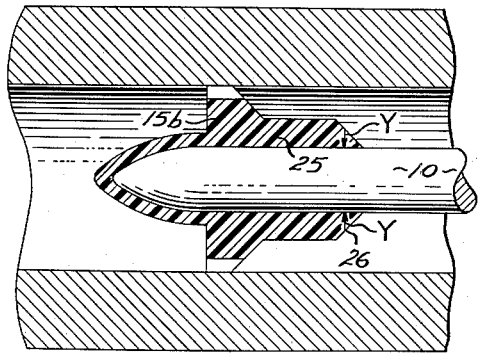
Fig. 6 is a view generally corresponding to Figs. 2 and 4 but showing a stud having on the front end thereof another modified form of centering and guiding member.

In the embodiment of the invention illustrated in Fig. 6, the centering and guiding portion 15b of the centering and guiding member is of the general form of that of the embodiment of Figs. 1 to 3 inclusive. However, in this third embodiment of the invention, the centering and guiding portion 15b has been moved forwardly relative to the body portion 14b of the centering and guiding member. This provides rearwardly of such centering and guiding portion 14b a body portion section 25 which may be, and here is shown as being, of somewhat greater thickness than that of the front section of said body portion.

As shown in Fig. 6, the rear face 26 of the rear body section 25 of the centering and guiding member of Fig. 6 is of beveled or tapered form, so that the exploded gases striking such face will develop an inwardly directed component of force Y which will aid in the retention of the centering and guiding member on the stud. Also, the exploded gases striking the outer cylindrical surface of the rear body section 25 will aid in the retention of the centering and guiding member on the stud, as will be readily understood. It will be understood that this embodiment takes advantage of that feature of the invention which comes from disposition of the flange or centering and guiding portion forwardly on the body portion to provide not only limited confinement of the exploded gases rearwardly of barrel engagement but also a rearwardly extending cylindrical part of the body portion in the presence of the confined gases so that the cylindrical part can be pressurized and flexed radially inward over an enlarged gripping area on the shank of the stud. The same action occurs on the beveled or tapered surfaces of the conical or frusto-conical sections of this and the other embodiments. What is provided in all is a surface located rearwardly of barrel engagement and adapted to be struck by the exploded gases so that their force is exerted toward the axis.

Figure 7:
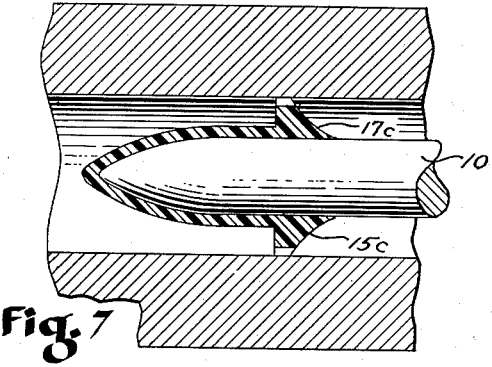
Fig. 7 is a view generally corresponding to Figs. 2, 4 and 6 but showing a stud having on the front end thereof another modified form of centering and guiding member.
Figure 8:
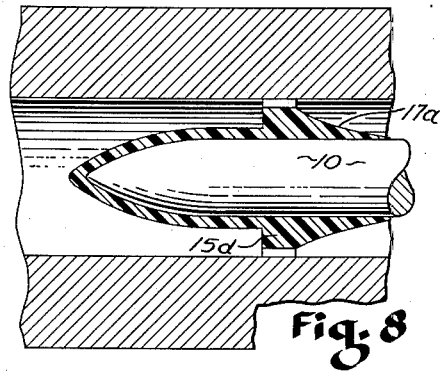
Fig. 8 is a view generally corresponding to Figs. 2, 4 6 and 7 but showing a stud having on the front end thereof another modified form of centering and guiding member.

With respect to the embodiment of the invention illustrated in Fig. 7, and the embodiment of the invention illustrated in Fig. 8, they show that the rear faces of the tool barrel-engaging portions of the stud centering and guiding members may take arcuate forms or shapes. For example, such faces may be of generally concave form in longitudinal section, such as the relatively short concave face 17c of the centering and guiding portion 15c of the stud centering and guiding member of Fig. 7, or the relatively long concave face 17d of the centering and guiding portion 15d of the centering and guiding member of Fig. 8.

Figure 9:
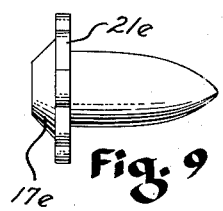
Fig. 9 is a side elevational view of another modified form of centering and guiding member.
Figure 10:
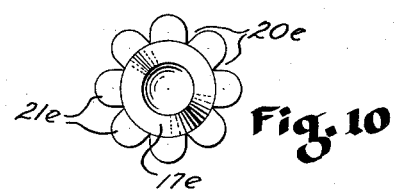
Fig. 10 is a rear end view of the centering and guiding member of Fig. 9.

In the last embodiment of the invention, namely, that shown in Figs. 9 and 10, the centering and guiding portion of the stud centering and guiding member has a rim or outer edge section of scalloped form, with the consequent provision of a series of circumferentially disposed, generally V-shaped gas by-pass notches 20e preferably in the scalloped form shown and intervening, individually flexible barrel-engaging projections 21e for centering and guiding purposes.

In this embodiment of the invention, the beveled or tapered rear face 17e of the centering and guiding portion does not extend to the outer edges of the circumferentially extending projections 21e but to the inner edges or bases thereof. As a result, such projections are thinner and somewhat more flexible longitudinally or axially than they otherwise would be. However, if desired, such face 17e could extend to the other edges of the projections 21e, just as the rear faces of the centering and guiding portions of the other embodiments could terminate short of the outer edges of such portions.

In all embodiments of the invention, the stud centering and guiding members are provided with surfaces on which the exploded gases are effective to develop force components tending to hold such members on their studs. Moreover, in all such centering and guiding members, passageways are provided to permit limited amounts of the exploded gases to by-pass the stud centering and guiding members. In passing through such passageways, the exploded gases also assist in the retention of the centering and guiding members on the studs, especially if such passageways are of the form shown in Figs. 4 and 5.

To those skilled in the art to which the present invention relates, further features and advantages of said invention will be evident from the foregoing description of certain embodiments of the invention.

What is claimed is:

1. A stud for penetration into relatively hard material by its ejection through the bore of the barrel of an explosively-actuated stud driving tool, said stud comprising a shank portion and a headed rear end portion, said headed portion being of a cross dimensional size generally corresponding to that of said barrel bore, whereby said headed portion serves as a rear guiding and centering means for the stud in its ejection through said barrel bore, the shank portion of said stud being of a cross-dimensional size appreciably less than that of the headed portion thereof and said shank portion having a front end part tapered to a point to facilitate the penetration of the stud into said relatively hard material, said stud also having a front guiding and centering means which comprises a one-piece member having a resilient body portion retained on the stud shank portion, said body portion having a tapered socket open at its rear end, which generally corresponds in size and shape to the tapered front end part of said stud shank portion to snugly receive said end part, and said member also having a resilient axially flexible circumferentially disposed flange means so formed integrally with the body portion thereof and extending generally outwardly therefrom and axially spaced from the stud headed portion and from the rear end of said body portion for yieldable guiding and centering engagement with the tool barrel in the ejection of the stud through the bore of said barrel and for development of a component of force of the exploded gases toward the axis sufficiently to press said body portion inwardly to increase the retention of said member on said shank portion during driving thereby resisting the component of force of said gases tending to strip said member off said shank portion.

2. The stud of claim 1 wherein the centering and guiding portion terminates marginally in a relatively thin rim section serrated for adapting the stud for easy insertion into the bore of the tool barrel and to provide a series of circumferentially equally spaced passageways for part of the exploded gases.

3. The stud of claim 1 wherein the centering and guiding portion terminates marginally in a relatively thin rim section and has an annular series of circumferentially equally spaced internal passageways therethrough for part of the exploded gases.

4. The stud of claim 2 wherein the rear surface of the centering and guiding means is forwardly inclined to be frusto-conical.

5. The stud of claim 1, wherein both said body portion and flange portion have a sloped rear surface directed forwardly and outwardly whereby all rear surfaces of the front guiding and centering means are inclined to develop flexure to press at least said body portion inwardly to maintain retention of said means.

6. The stud of claim 5 wherein the flange portion is a relatively thin rim with passageways providing escape for some of the explosive driving gas.

7. The stud of claim 1 wherein at least the body portion has a sloped rear surface directed forwardly and outwardly and wherein the flange portion forms a relatively thin notched rim providing a circumferentially equally spaced plurality of the escape passageways for by-pass of some of the gas, said notches being of a width substantially less than that of the intervening unnotched parts of said rim.

8. The stud of claim 7 wherein only the body portion has a sloped rear surface and wherein the centering and guiding flange portion is notched in scalloped form.

References Cited in the file of this patent

UNITED STATES PATENTS

| | | |
|---|---|---|
| 39,112 | Berney | July 7, 1863 |
| 269,101 | Palliser | Dec. 12, 1882 |
| 2,115,028 | Logan | Apr. 26, 1938 |
| 2,336,819 | Turechek | Dec. 14, 1943 |
| 2,452,057 | Kehoe | Oct. 26, 1948 |
| 2,637,241 | Webber et al. | May 5, 1953 |
| 2,676,508 | Erickson | Apr. 27, 1954 |
| 2,761,348 | Williams et al. | Spet. 4, 1956 |
| 2,811,901 | Barr | Nov. 5, 1957 |

FOREIGN PATENTS

| | | |
|---|---|---|
| 503,594 | Italy | Dec. 6, 1954 |
| 1,078,680 | France | May 12, 1954 |